Nov. 18, 1958     B. BARÉNYI     2,860,912
PARTITION WALLS DEFINING THE PASSENGER
COMPARTMENT OF MOTOR VEHICLES
Filed May 20, 1955

INVENTOR

BELA BARENYI

BY *Dicke and Craig*

ATTORNEYS

United States Patent Office 2,860,912
Patented Nov. 18, 1958

2,860,912

PARTITION WALLS DEFINING THE PASSENGER COMPARTMENT OF MOTOR VEHICLES

Béla Barényi, Stuttgart-Hohenheim, Germany

Application May 20, 1955, Serial No. 509,948

Claims priority, application Germany January 26, 1949

6 Claims. (Cl. 296—28)

The present invention relates to a motor vehicle with a passenger compartment, which is defined in a longitudinal direction by transverse partitions.

Although it has been known prior to this invention to provide motor vehicles such as automobiles or the like with one or more transverse partitions which serve as supports of the upper body and also for closing off the interior of the passenger compartment toward the front and rear, such partitions have always consisted of substantially straight and flat metal plates behind the front wheels and in front of the rear wheels, respectively, which restricted the size of the compartment considerably.

It is the object of the present invention to provide a motor vehicle with a passenger compartment which is of a size considerably larger than was previously possible, despite the use of transverse partitions at the front and rear ends of the compartment.

A further object of the invention is to provide a motor vehicle in which the transverse partitions which define the passenger compartment are shaped in a particular manner so as to constitute a stronger reinforcement of the vehicle body, as well as a safer, more secure protection of the driver and passengers of the vehicle.

Another object of the invention is to provide a motor vehicle, the transverse partitions of which are constructed so as to prevent a booming noise of the vehicle body while driving the same and to act as sound-absorbing means.

A feature of the present invention for accomplishing the above-mentioned objects consists in the simple means of bending or curving the transverse partitions in an outward direction as seen from the passenger compartment, and about an axis of curvature which lies within the central vertical longitudinal plane of the vehicle and parallel to the transverse partitions. More specifically, the front partition is preferably made of a steel plate which is curved toward the front so as to obtain, when seen in the horizontal plane, the shape of an arc of substantially uniform curvature, or a shape in which the center portion of the partition wall consists of a short curved portion, and lateral arm portions extending from this curved portion toward the sides of the partition plate in a more or less straight direction forming an angle therebetween. The rear partition, if provided, may be bent in a similar manner toward the rear.

Figure 1:
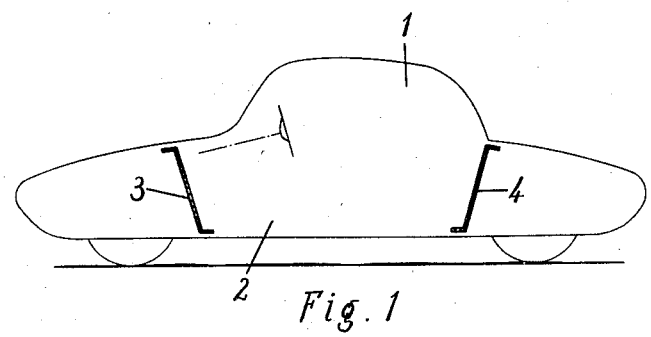
Figure 2:
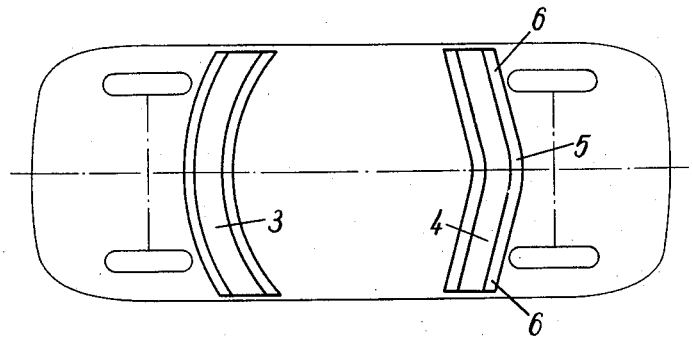

Further objects, features, and advantages of the present invention will appear from the following detailed description of two embodiments thereof, as well as from the accompanying drawings, in which Fig. 1 shows a diagrammatic longitudinal section of an automobile with two different partitions according to the invention mounted therein, while Fig. 2 shows a diagrammatic top view looking through the car as shown in Fig. 1.

Referring to the drawings, two partitions 3 and 4 are provided between the upper part 1 of the car body and its lower part 2. They may constitute elements separate from the upper part 1 and be connected in any suitable manner with both the upper and lower parts 1 and 2.

Fig. 2 shows at the left side a transverse partition 3 which has a substantially continuous curvature, while the transverse partition 4 at the right side of Fig. 2 is of a flattened arrowhead-like shape with a curved portion 5 at the center thereof extending into substantially straight lateral surfaces 6. As can be clearly seen from either embodiment of the invention as shown in Fig. 2, the bent or curved shape of the partitions allows their largest central portion to extend considerably between the wheels and toward the wheel axles, thus considerably extending the area of the passenger compartment and especially of the leg room at the front seats.

The curvature of either form of partition has the additional advantage that it exerts an outwardly directed force upon the outer walls of the car, sustaining and reinforcing the same far more than the customary straight partitions. Also, whereas large straight metal sheets as previously used for such transverse partitions have a tendency toward vibrations transmitted thereto by the running engine and the unevenness of the road, and to emit a booming sound caused by such vibrations, the curvature of the partitions according to the invention avoids such vibrations and sound and renders the passenger compartment much quieter.

The partitions according to the present invention may be installed either during the manufacture of the car or other vehicle or may be easily substituted for the customary straight partitions at any time subsequent to the car's manufacture.

The particular shapes of the partitions as illustrated in the drawings are merely given as an example and may be modified at will without departing from the spirit and the scope of the invention as specified in the appended claims, the basic concept of the invention being that the transverse partitions which define the size of the passenger compartment either forwardly or rearwardly or in both directions are shaped so as to extend the length of such compartment increasingly from the side walls of the car body toward the central longitudinal plane thereof. Such increase in size may be further enhanced if the curved or angular partitions are shaped and installed so as to incline upwardly from the bottom of the passenger compartment toward the adjacent end of the vehicle.

Having thus fully described my invention, what I claim is:

1. A motor vehicle having a body forming a passenger compartment and at least one separate transverse partition wall adapted to be connected to said body and defining by itself over the entire surface thereof the extent of said compartment in the longitudinal direction of the vehicle, said partition wall being constituted by a separate member independent from adjacent parts of the vehicle body and being at least partly bent in the direction toward the adjacent end of said vehicle about an axis disposed within the central vertical longitudinal plane of said vehicle and substantially parallel to said transverse partition wall, said partition wall being also inclined upwardly, outwardly from the bottom of said compartment toward the respective adjacent end of said vehicle so that its upper end is located closer to the respective end of said vehicle than is the lower end thereof thereby constituting a strong and vibration-free reinforcement of said vehicle body that provides greater protection to the passengers of the vehicle and eliminates annoying vibration noise.

2. A motor vehicle having a body forming a passenger compartment, at least one separate transverse partition wall adapted to be connected to said body and defining by itself over the entire surface thereof the extent of said compartment in the longitudinal direction of the vehicle, said partition wall being constituted by a separate member independent from adjacent parts of the vehicle body and being of arcuate shape of substantially uniform curvature and being bent in the direction toward the adjacent end of said vehicle about an axis disposed within the central vertical longitudinal plane of said vehicle and substantially parallel to said transverse partition wall, said partition wall being also inclined upwardly, outwardly from the bottom of said compartment toward the respective adjacent end of said vehicle so that its upper end is located closer to the respective end of said vehicle than is the lower end thereof thereby constituting a strong and vibration-free reinforcement of said vehicle body that provides greater protection to the passengers of the vehicle and eliminates annoying vibration noise.

3. A motor vehicle having a body forming a passenger compartment and at least one separate transverse partition wall adapted to be connected to said body and defining by itself over the entire surface thereof the extent of said compartment in the longitudinal direction of the vehicle, said partition wall being constituted by a separate member independent from adjacent parts of the vehicle body and being bent in the direction toward the adjacent end of said vehicle about an axis disposed within the central vertical longitudinal plane of said vehicle and substantially parallel to said transverse partition wall, said partition wall hving a short curved portion in the center thereof with an essentially vertical axis of curvature passing over toward its sides into substantially straight portions extending toward the side walls of said vehicle, said straight portions being disposed so as to form an angle of less than 180° therebetween thereby constituting a strong and vibration-free reinforcement of said vehicle body that provides greater protection to the passengers of the vehicle and eliminates annoying vibration noise.

4. A motor vehicle having a body forming a passenger compartment and at least one separate transverse partition wall adapted to be connected to said body and defining by itself over the entire surface thereof the extent of said compartment in the longitudinal direction of the vehicle, said partition wall being constituted by a separate member independent from adjacent parts of the vehicle body and being at least partly bent in the direction toward the adjacent end of said vehicle about an axis disposed within the central vertical longitudinal plane of said vehicle and substantially parallel to said transverse partition wall, said partition wall being inclined upwardly, outwardly from the bottom of said compartment toward the respective adjacent end of said vehicle and extending upwardly from said bottom at every point of its lentgh in a substantially straight line thereby constituting a strong and vibration-free reinforcement of said vehicle body that provides greater protection to the passengers of the vehicle and eliminates annoying vibration noise.

5. A motor vehicle of pontoonlike shape having front and rear wheels substantially enclosed by a pontoon, a passenger compartment extending along the entire width of said vehicle and disposed between said front and rear wheels, and separate transverse walls adapted to be connected to said body and defining by themselves over the entire surface thereof the extent of said compartment, each of said partition walls being constituted by separate members independent from adjacent parts of the vehicle body and being of arcuate shape of substantially uniform curvature and bent in its entirety in the direction toward the adjacent end of said vehicle about an axis disposed within the central vertical longitudinal plane of said vehicle, said partition walls being inclined upwardly, outwardly from the bottom of said compartment toward the respective adjacent ends of said vehicle so as to be spaced farther apart at their upper ends than at their lower ends thereby constituting a strong and vibration-free reinforcement of said vehicle body that provides greater protection to the passengers of the vehicle and eliminates annoying vibration noise.

6. A motor vehicle having a passenger compartment according to claim 1, wherein said partition wall includes a flange portion along the upper and lower curved edges thereof, said flange portions extending in an approximately horizontal direction.

References Cited in the file of this patent

UNITED STATES PATENTS

| | | |
|---|---|---|
| 1,917,396 | Schantz et al. | July 11, 1933 |
| 2,233,316 | Klavik | Feb. 25, 1941 |
| 2,700,571 | Barényi | Jan. 25, 1955 |
| 2,710,222 | Barényi | June 7, 1955 |

FOREIGN PATENTS

| | | |
|---|---|---|
| 940,185 | France | May 10, 1948 |

OTHER REFERENCES

Ser. No. 368,684 Barényi et al. (A. C. P.), published May 25, 1943.